United States Patent
Nelson et al.

(10) Patent No.: US 10,933,806 B2
(45) Date of Patent: Mar. 2, 2021

(54) SEAT OR VEHICLE IDENTIFICATION FOR A RIDESHARE

(71) Applicant: Ford Global Technologies, LLC, Dearborn, MI (US)

(72) Inventors: Zachary David Nelson, Dearborn, MI (US); Hyung Min Baek, Dearborn, MI (US); Daniel Boccuccia, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 16/479,431

(22) PCT Filed: Jan. 25, 2017

(86) PCT No.: PCT/US2017/014895
§ 371 (c)(1),
(2) Date: Jul. 19, 2019

(87) PCT Pub. No.: WO2018/140000
PCT Pub. Date: Aug. 2, 2018

(65) Prior Publication Data
US 2019/0344707 A1 Nov. 14, 2019

(51) Int. Cl.
*B60Q 1/00* (2006.01)
*B60Q 3/233* (2017.01)
*B60Q 3/80* (2017.01)
*B60N 2/00* (2006.01)
*B60Q 1/50* (2006.01)

(52) U.S. Cl.
CPC .......... *B60Q 3/233* (2017.02); *B60N 2/002* (2013.01); *B60Q 1/50* (2013.01); *B60Q 3/80* (2017.02)

(58) Field of Classification Search
CPC .......... B60Q 3/233; B60Q 3/80; B60Q 1/50; B60N 2/002
See application file for complete search history.

(56) References Cited

U.S. PATENT DOCUMENTS

| | | | |
|---|---|---|---|
| 2005/0184565 A1* | 8/2005 | Weiss | B60N 2/5635 297/180.15 |
| 2010/0214795 A1* | 8/2010 | Salter | B60Q 3/54 362/488 |
| 2014/0125355 A1* | 5/2014 | Grant | G01R 27/2605 324/629 |
| 2017/0072903 A1* | 3/2017 | Farshchi | B60R 22/48 |
| 2018/0039917 A1* | 2/2018 | Buttolo | G06Q 10/0631 |
| 2019/0002000 A1* | 1/2019 | Van Den Wouwer | H02S 40/38 |
| 2019/0172170 A1* | 6/2019 | Jabour | G06Q 30/0643 |

* cited by examiner

Primary Examiner — Phung Nguyen
(74) Attorney, Agent, or Firm — Brandon Hicks; Eversheds Sutherland (US) LLP

(57) ABSTRACT

Systems, methods, and devices for indicating a status of a vehicle or a seat in a vehicle are disclosed herein. A system includes a plurality of seats in a vehicle, a light-diffusing fiber optic light source attached to at least one of the seats, a receiver configured to receive a status of at least one of the seats, and a controller. The controller may be configured to determine an illumination scheme based on the status of at least one of the seats and illuminate the light-diffusing fiber optic light source according to the illumination scheme.

17 Claims, 9 Drawing Sheets

SEAT OR VEHICLE IDENTIFICATION FOR A RIDESHARE

TECHNICAL FIELD

The disclosure relates generally to methods, systems, and apparatuses for seat or vehicle identification for a passenger, and particularly to illuminating a light source on or in a vehicle for passengers in a rideshare environment.

BACKGROUND

Ridesharing allows passengers to share a vehicle to reduce vehicle trips, traffic congestion, and vehicle emissions. Types of transportation that may be considered ridesharing include carpooling, vanpooling, public transportation (including bus, train, or other vehicle types), or the like. Passengers in a rideshare environment might have assigned seats on a vehicle or they might reserve a seat on a vehicle. Further, different passengers in a rideshare environment might enter and exit the vehicle at different times and locations.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
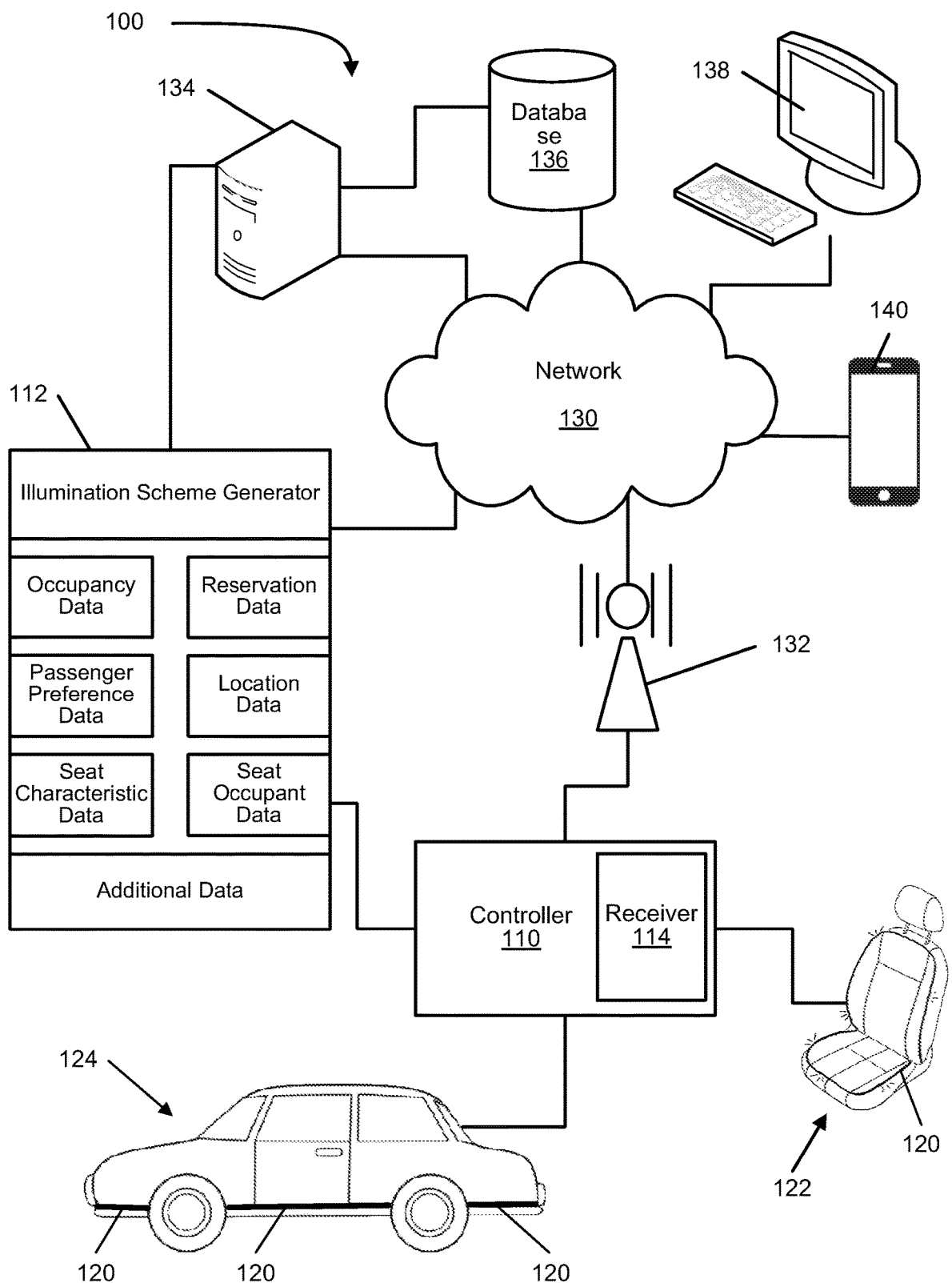
FIG. 1 is a schematic diagram illustrating a rideshare illumination system, according to one implementation.

Ridesharing systems are becoming a popular method of transportation because passengers may, among other things, reduce vehicle trips, share transportation costs, reduce vehicle emissions, and reduce active time spent operating a vehicle. Some rideshare systems allow passengers to reserve a seat on the rideshare vehicle in advance of the trip. Different seats may have different characteristics that may be desirable to passengers, and it may be beneficial to allow passengers to reserve a particular seat for the trip. Further, in some locations there may be many ridesharing vehicles in use and it may be beneficial to designate or mark a particular vehicle so that passengers may quickly find the correct rideshare vehicle.

Applicants have developed systems, methods, and devices for illuminating a vehicle or a seat in a vehicle in a rideshare application. According to one embodiment, a system includes a controller, an illumination scheme generator, and a light-diffusing fiber optic source. The light-diffusing fiber optic light source may be attached to a seat or the exterior of a vehicle. The illumination scheme generator may determine an illumination scheme for the light source that may be based on, for example, an occupancy status, a reservation status, or a passenger's preference. The controller is configured to light the light-diffusing fiber optic according to the illumination scheme.

For example, in an implementation, a passenger may reserve a seat on a rideshare vehicle. The passenger might reserve a particular seat on the vehicle and indicate a pickup time and location for the passenger to board the vehicle. To increase the simplicity and efficiency in boarding the vehicle, the passenger may receive an indication that the rideshare vehicle and/or the reserved seat will be illuminated in a particular color. When the rideshare vehicle approaches the appropriate pickup location at the appropriate time, the vehicle may be illuminated in the color that the passenger is expecting based on the indication that the passenger received. This may enable the passenger to quickly find the vehicle and feel secure in approaching the vehicle. Further, the passenger's reserved seat may be illuminated in the color that the passenger is expecting based on the indication that the passenger received. This may enable the passenger to quickly board the vehicle and sit in the reserved seat without wasting time or holding up traffic.

According to one embodiment, a rideshare vehicle or at least one of the seats in the rideshare vehicle includes a light-diffusing fiber optic light source attached to the vehicle or the seat. The light-diffusing fiber optic light source may be illuminated in a plurality of colors and at a plurality of light intensities. The light-diffusing fiber optic light source attached to the exterior of the vehicle may be illuminated according to different illumination schemes. Each illumination scheme might indicate, for example, the route that a rideshare vehicle is driving, the occupancy status of the vehicle, a driver rating for the driver of the vehicle, or it may indicate a personalized illumination scheme to notify a waiting passenger that the correct rideshare vehicle is approaching. Additionally or alternatively, the light-diffusing fiber optic light source may be attached to at least one of the seats within the vehicle and the light source may be illuminated according to different illumination schemes. The illumination scheme might indicate, for example, an occupancy status of the seat, a reservation status of the seat, a special characteristic of the seat, a health status of an occupier of the seat, or it may indicate a personalized illumination scheme to indicate which seat has been reserved for a passenger who is boarding the rideshare vehicle.

Further embodiments and examples will be discussed in relation to the figures below.

FIG. 1 is a schematic diagram of an illumination system 100. The system 100 includes a light-diffusing fiber optic light source 120 attached to, for example, a seat 122 or a vehicle 124. The system 100 may further include a controller 110 that may be electronically connected to or in electronic communication with the light source 120. The controller 110 may include a receiver 114 that may be configured to receive data from any source. The controller may be configured to illuminate the light source 120 according to an illumination scheme. The controller 110 may be in electronic communication with a network interface 132. The network interface 132 may provide network 130 access to the controller 110. The system 100 may further comprise an illumination scheme server 134 providing a web based user interface on a display on a computer 138 or mobile device 140. The system 100 may include a database 136 that may comprise data such as vehicle route data, vehicle characteristic data, seat configuration data, operational historical data, user data, location data, reservation data, occupancy status data, and other data that may be used in determining an illumination scheme in a vehicle. The system 100 may further comprise an illumination scheme generator 112.

The system 100 may further include an illumination scheme generator 112 that may use data from a plurality of sources or databases for generating an illumination scheme, wherein the generation of the illumination scheme can be determined at least in part by a set of specialized parameters. It should be noted that the network 130 may be a cloud computing network, and/or the Internet, and/or part of a closed or private network without departing from the scope of the disclosure.

In an implementation, the light-diffusing fiber optic light source 120 may be attached to a seat 122 or a vehicle 124. The light-diffusing fiber optic light source 120 may be any such light source known in the art, including Fibrance® lighting produced by Corning®. A light-diffusing fiber optic light may be a glass optical fiber having an optical nano-structure that may emit or diffuse light out of the sides of the fiber and down the length of the fiber. The light-diffusing fiber optic light source 120 may be connected to a laser diode light source, or other light source, that may produce the "leaked" light along the length of the fiber. The light source 120 may be connected to a plurality of laser diodes in a plurality of colors such that the light source 120 may shine in any combination of colors. The light source 120 may further be configured to shine in a plurality of light intensities. The light source 120 may produce a controlled and steady stream of light, or it may produce a fractured stream of light or a blinking light. A strand or fiber of the light source 120 may be attached to an exterior of a seat 122 or an exterior of a vehicle 124 as pictured in FIG. 1. In an implementation, the light source 120 is attached to the upholstery of a seat 122 in a plurality of locations on the seat 122.

The controller 110 may be located within a vehicle, or other location and be electronically connected to or in electronic communication with the light source 120. The controller may be configured to illuminate the light source 120 according to an illumination scheme. The controller 110 may be in electronic communication with a network interface 132 that may connect the controller 110 to a network 130. The controller 110 may determine an illumination scheme by way of an illumination scheme generator 112. The controller 110 may receive the illumination scheme over a network 130 by way of the receiver 114 or it may determine the illumination scheme based on parameters. The controller 110 may be configured to receive an illumination scheme over a network 130 by way of the receiver 114 and then illuminate the light source 120 according to the illumination scheme. In an implementation, the controller 110 is configured to determine, alter, or override the illumination scheme received over a network 130 based on a user input that may be received over a network 130.

In an implementation, the controller 110 includes a screen or user interface that may allow a user to, for example, input data, alter an illumination scheme, override an illumination scheme, check a status of an illumination scheme, or engage an illumination scheme. The controller may be located within the vehicle and it may be electronically connected to a plurality of light-diffusing fiber optic light sources 120. The controller 110 may be configured to control the illumination of a plurality of light-diffusing fiber optic light sources 120 at the same time or at different times based on, for example, a location of the vehicle or a passenger, a time, or any indication that a light source 120 should be engaged or turned off.

In an implementation, the receiver 114 may be configured to receive a status of a seat. The status may include, for example, an occupancy status, a reservation status, a health status of an occupant of a seat, an illumination scheme preference for the seat, or any other data useful to the application of the embodiment. In an implementation, the receiver 114 may be configured to receive data from any data source, such as a database 136, a computer 138, a mobile device 140, a sensor, or a user input. The receiver 114 may receive data from, for example, a network 130, a direct electronic communication with a data source, or a user input into the controller 110.

In an implementation, a plurality of data sources and user interfaces may be connected to the system 100 over a network 130. An illumination scheme server 134 may provide a web-based or locally installed user interface that may be accessed from, for example, a computer 138 or a mobile device 140. The illumination scheme server 134 may provide an interface that may prompt a user, such as a driver or a passenger, to input data that may be communicated to the network 130. User-inputted data may include, for example, vehicle route data, vehicle characteristic data, seat arrangements, seat characteristics, reservation data, reservation preference data, and illumination scheme preference data. In an implementation, a passenger may use a mobile device 140 or a computer 138 to reserve a seat, select a preferred illumination color for the seat, and select a boarding time for the rideshare vehicle, among other things. This data may be communicated to the illumination scheme generator 112 and the controller 110 to illuminate the light source 120 according to the passenger's inputs.

In an implementation, the system 100 includes a database 136 that may be in communication with the network 130 and/or the illumination scheme server 134. The database 136 may include any data that is useful for the operation of the system 100. The data may include, for example, vehicle route data, passenger preference data, driver preference data, occupancy data, reservation status data, location data, seat characteristic data, seat occupant data, and any additional data that may be useful. In an implementation, a user such as a passenger or a driver may input data that may be stored in the database 136 and retrieved at a later time.

In an implementation, a passenger may reserve a seat on a rideshare vehicle and receive a notification that the seat will be illuminated in a particular color. The passenger may possess a mobile device 140 that may transmit the location of the passenger over the network 130 to the controller 110. The controller 110 may receive an indication that the passenger's mobile device 140 is within a close proximity to the vehicle, and the controller 110 may then illuminate the light source 120 according to the illumination scheme associated with that passenger. The passenger may board the rideshare vehicle and quickly locate the appropriate seat by seeking the seat that is illuminated according to the illumination scheme associated with the passenger, and which may have been previously communicated to the passenger.

In an implementation, the controller 110 may be configured to indicate a characteristic of a seat with the light-diffusing fiber optic light source 120. A characteristic of a seat may include, for example, the reservation status of the seat, whether the seat is in close proximity with an electronic charging port, whether the seat is near an airbag, or whether the seat is configured for use by a child or a person with a disability. A passenger may receive an advance notification, or there may be a notification within the vehicle, that indicates which color or illumination scheme is associated with a particular seat characteristic.

In an implementation, a driver of a rideshare vehicle or a company operating rideshare vehicles may wish to have the exterior of the vehicle illuminated when the vehicle is in use in a rideshare application. In such an implementation, the exterior of the vehicle 124 may include at least one light-diffusing fiber optic light source 120 attached to the vehicle 124. The light source 120 may illuminate according to a particular illumination scheme that might indicate, for example, the driving route of the vehicle, a rating of the vehicle driver, an occupancy status of the vehicle, or a personalized illumination scheme that might indicate to a nearby passenger that the expected rideshare vehicle is approaching. For example, a passenger may request a particular illumination color or may receive an indication that the rideshare vehicle will be illuminated in a particular color.

In an implementation, the vehicle may be illuminated in the expected color when the passenger is in close proximity with the vehicle. "Close proximity" may be defined as, for example, a physical distance or a time. For example, the light source 120 may be illuminated when the passenger's reserved time for pickup is approaching, for example the light source 120 may be illuminated according to the illumination scheme at ten minutes, one minute, a number of seconds, or any other amount of time before the pickup time. For example, the vehicle may be illuminated when the vehicle approaches the reserved pickup location or the vehicle approaches the passenger.

In an implementation, the passenger possesses a mobile device 140 that indicates a location of the passenger over a network 130, and the vehicle includes a GPS that indicates a location of the vehicle over a network 130. In such an implementation, the controller 110 may illuminate the light source 120 according to the illumination scheme when the passenger and the vehicle or within a threshold distance from each other. In an implementation, a driver of the vehicle may make an indication to the controller 110 to illuminate the light source 120 according to the illumination scheme when the driver is approaching the pickup location or when the driver is within visual distance of the passenger. In an implementation, a passenger may indicate on, for example, a mobile device 140 that the passenger is at the reserved pickup location and wishes to have the light source 120 on the vehicle be illuminated. In such an implementation, the controller 110 may receive the indication from the passenger over a network 130 and proceed to illuminate the light source 120 according to the illumination scheme and based on the passenger's request.

In an implementation, an illumination scheme may indicate a health status of a passenger. For example, a passenger may be connected to a sensor, such as a heart rate sensor or a blood oxygen sensor, and data from the sensor may be transmitted to the controller 110. The sensor may transmit data over a network 130 and the controller 100 may receive that data over a network 130, or the sensor may be in electronic communication with the controller 110. The illumination scheme generator 112 may determine an illumination scheme based on the sensor data and the controller 110 may illuminate an appropriate light source 120 according to the illumination scheme. In a further implementation, a passenger or a driver may indicate that a passenger is in distress, and the controller 110 may illuminate an appropriate light source 120 based on the indication that the passenger is in distress. In a further implementation, an illumination scheme may indicate, for example, that a passenger has a special health need, has a disability, or has an allergy, or it may indicate any other useful information about the passenger.

In a further implementation, the controller 110 may be configured to receive an indication that the vehicle has been involved in an automobile accident. The controller 110 may further receive an indication of a health status of a passenger and the controller 110 may illuminate the appropriate seat according to the health status of the passenger. For example, in the event of an accident or other occurrence, the display of health status may be activated for accelerated identification of passengers that may be in need. Such an implementation may be desirable to efficiently inform emergency personnel of a health status of a passenger in the vehicle.

Figure 2:
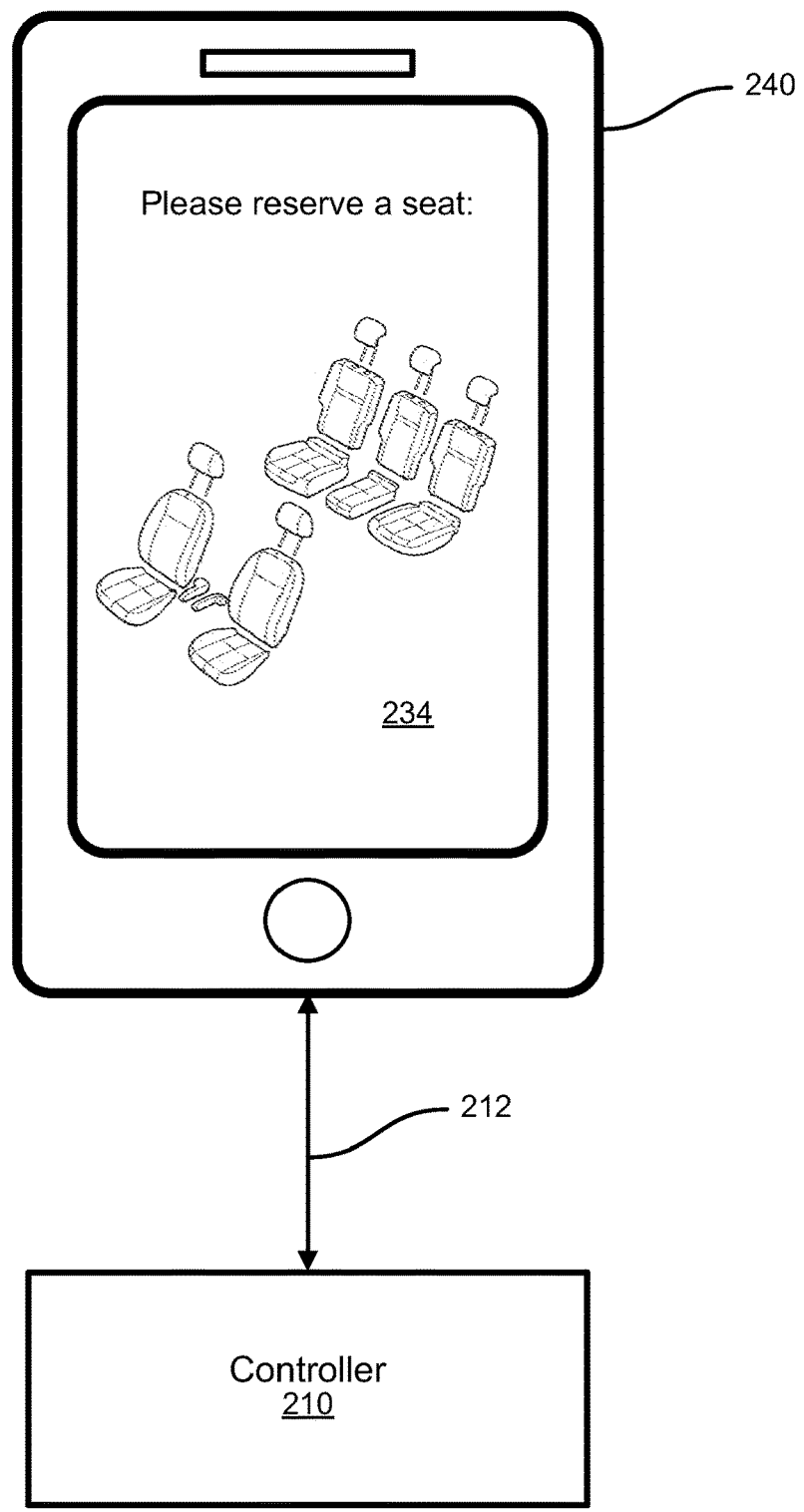
FIG. 2 is a schematic diagram illustrating a mobile device communicating with a controller in a rideshare illumination system, according to one implementation.

FIG. 2 is a schematic diagram of a mobile device 240 communicating with a controller 210 over a wired or wireless communication link 212. The mobile device 240 may include a user interface 234 that may be integrated into, for example, a website or a mobile phone application. A user, such as a passenger, a driver, or a rideshare company, may input data using the user interface 234 and the data may be communicated 212 to the controller 210, illumination scheme server 134, database 136, and/or illumination scheme generator 112. In an implementation, the mobile device 240 may also automatically communicate location data to the controller 210, illumination scheme server 134, database 136, and/or illumination scheme generator 112. In an implementation, a user may input data such as, for example, route data, reservation data, occupancy data, seat characteristic data, and illumination scheme preference data.

It should be noted that a device might communicate with the controller 210 in a plurality of different ways without departing from the scope of the disclosure. In an implementation, a mobile device 240 has network access, such as cellular network access or wireless Internet access such as Wi-Fi or a hotspot, and the mobile device 240 may communicate with the controller 240 over a network 130. In an implementation, a device may be in direct electronic communication with the controller 240 using an available wireless communication scheme such as Wi-Fi, Bluetooth, or the like.

Figure 3:
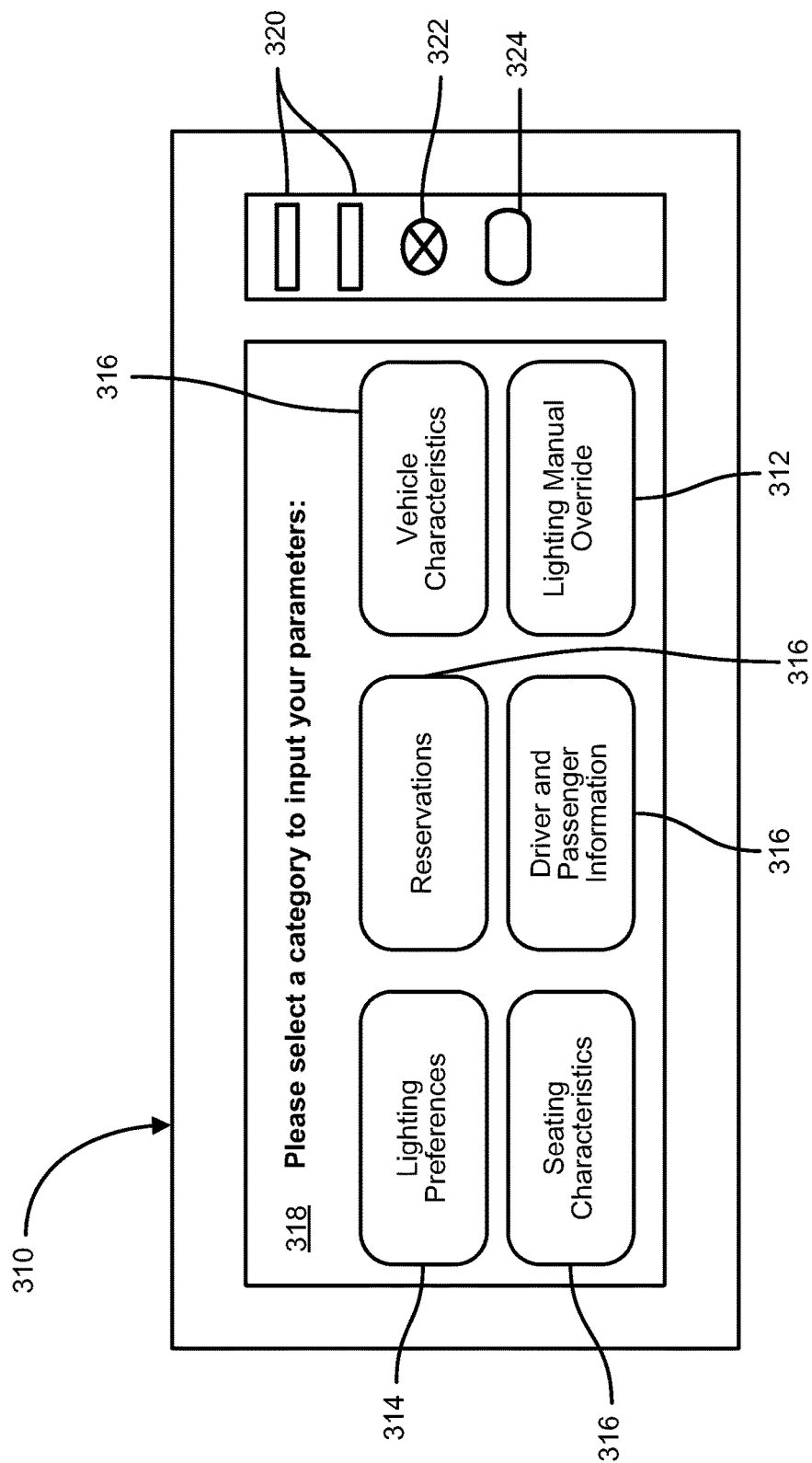
FIG. 3 is a schematic diagram illustrating a controller having a user interface, according to one implementation.

FIG. 3 is a schematic drawing of a controller 310 with a user interface in accordance with an embodiment of the invention. The controller 310 may include a screen 318, such as a touch screen, or other user interface. The controller 310 may include ports for enabling electronic communication with the controller 310. The ports may include, for example, USB ports 320, auxiliary ports 322, or any other port 324 known in the art. The controller 110 may be in electronic or wireless communication with, for example, a network interface 132, a sensor, a database 136, a computer 138, a mobile device 140, or any other device useful to the application and known in the art. The controller 310 may include options for a user to input parameters or data. A user may input, for example, lighting preferences 314 including light color, illumination intensity, duration of illumination, and other lighting characteristics. A user may input a plurality of other data points 316 including, for example, seating characteristics, reservations, driver and passenger information, and vehicle characteristics. A user may also manually override 312 an illumination scheme or adjust the illumination of the light source (e.g. 120, FIG. 1) directly through the controller 310.

Figure 4:
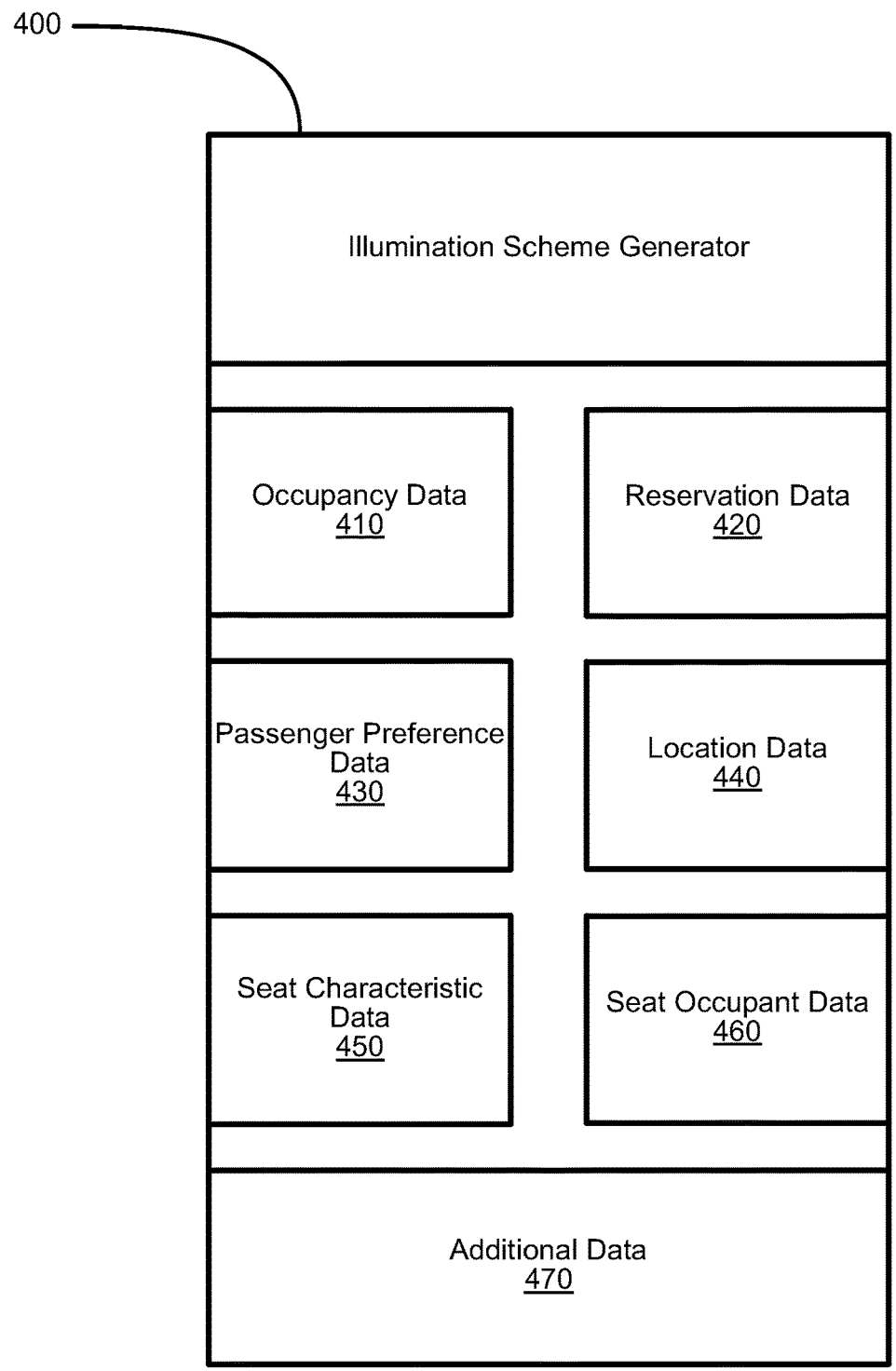
FIG. 4 is a schematic diagram illustrating an illumination scheme generator, according to one implementation.

FIG. 4 is a schematic diagram of an illumination scheme generator 400 in accordance with an embodiment. The illumination scheme generator 400 may be configured to determine an illumination scheme based on a plurality of parameters 410, 420, 430, 440, 450, 460, and 470.

One of the data parameters may include occupancy data 410 that may indicate an occupancy status of a vehicle or seat. The occupancy data 410 may indicate whether the vehicle or seat is currently occupied, by whom it is occupied, how long it will be occupied, and/or when it is expected to be occupied. The reservation data 420 may indicate a reservation status of a vehicle or seat, including whether a vehicle or seat is reserved, by whom it is reserved, and/or when it is reserved.

The passenger preference data 430 may include any data associated with a passenger preference. The passenger preference data 430 may include, for example, a passenger's boarding time preference, seat preference, seat characteristic preference, vehicle characteristic preference, and/or illumination scheme preference data. A seat characteristic preference data may indicate, for example, that a passenger prefers a window seat, a seat with a nearby electronic charging port, a seat configured for use by a child, a seat configured for use by a person with a disability, a seat with additional legroom or baggage space, or any other seat characteristic. A vehicle characteristic preference data may indicate, for example, that a passenger prefers a particular model or type of vehicle, a particular vehicle color, a particular vehicle seat configuration, or any other vehicle characteristic. An illumination scheme preference data may indicate, for example, that a passenger prefers a vehicle or seat to be illuminated in a particular color, for a particular length of time, at a particular time, based on a particular parameter such as occupancy status or the passenger's health status, or any other illumination scheme characteristic.

The location data 440 may indicate, for example, a location of a vehicle, a location of the vehicle's route, or a location of a driver or passenger. The location data 440 may be received from a GPS unit attached to a vehicle or, for example, a passenger's mobile device. The location data 440 may be used to indicate when a light source (e.g., 120 in FIG. 1) should be illuminated, for example, based on the proximity of a passenger to a rideshare vehicle.

The seat characteristic data 450 may indicate any characteristic associated with a seat or with a vehicle. Characteristic data for a vehicle may include, for example, the make and model of the vehicle, the year the vehicle was manufactured, the color of the vehicle, the number of seats in the vehicle, the safety rating for the vehicle, the service or accident record for the vehicle, or any other vehicle characteristic. Characteristic data for a seat may include, for example, where the seat is located in the vehicle, the type of seat, the type of upholstery on the seat, whether the seat has additional legroom or baggage space, whether the seat is near an electronic charging port, whether the seat is configured for use by a child or a person with a disability, whether the seat is located near an airbag, or any other seat characteristic.

The seat occupant data 460 may indicate any data about an occupant of a seat or, in an implementation, about a driver of a vehicle. Data about an occupant of a seat may include, for example, a name, age, or description of the occupant, a passenger rating for the occupant, a payment method for the occupant, a health status of an occupant, a special need of the occupant, or any other occupant data. Data about a driver of a vehicle may include, for example, a name, age, or description of the driver, a driver license number of the driver, a driving record of the driver, a driver rating of the driver, or any other driver data.

Additional data 470 may include any other data that might be useful to the generation of an illumination scheme by the illumination scheme generator 400. The illumination scheme generator 400 may determine an illumination scheme based on at least one of the data received from any source. In an implementation, the illumination scheme generator 400 will determine at least one of a seat or vehicle to be illuminated, an illumination color, an illumination duration, and an illumination time or location.

The illumination scheme generator 400 may generate an illumination scheme for one or more seats in a vehicle. For example, a vehicle, or one or more seats in a vehicle, may be illuminated according to their respective illuminations schemes each time a passenger exits or enters the vehicle. As an example, a first seat may be illuminated according to a first illumination scheme having a blinking blue light which has been communicated to or selected by a first user, a second seat may be illuminated according to a second illumination scheme with a solid orange light which has been communicated to or selected by a second user, and a third seat may be shown with solid red to indicate that the seat is reserved and not available for sitting. Any combination of colors, blinking patterns, or the like may be used to uniquely identify a status, availability, or other characteristic of a seat.

Figure 5:
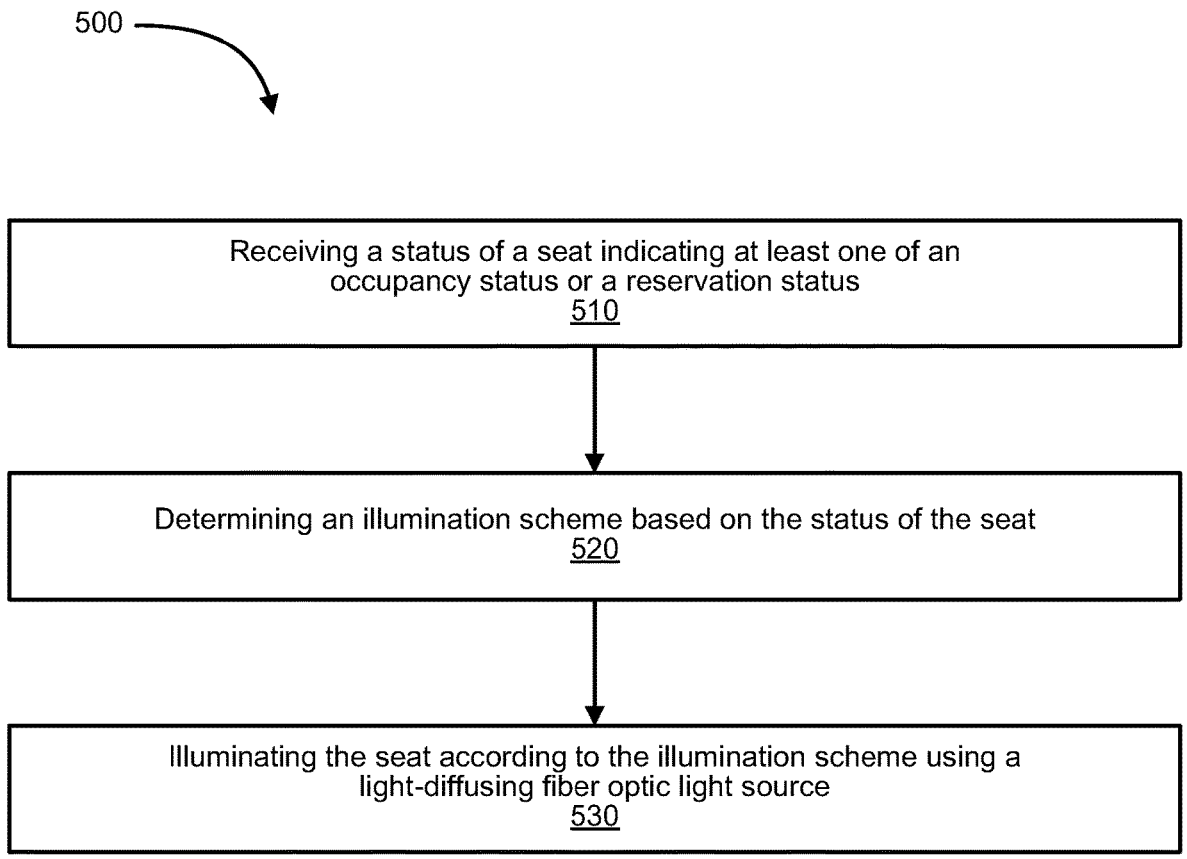
FIG. 5 is a schematic flow chart diagram illustrating a method for illuminating a light source in a rideshare application, according to one implementation.

FIG. 5 is a schematic flow chart diagram illustrating a method 500 of indicating a status of a seat. The method 500 begins and a controller receives a status of a seat indicating at least one of an occupancy status or a reservation status 510. An illumination scheme generator determines an illumination scheme based on the status 520. A controller illuminates the seat according to the illumination scheme using a light-diffusing fiber optic light source 530.

Figure 6:
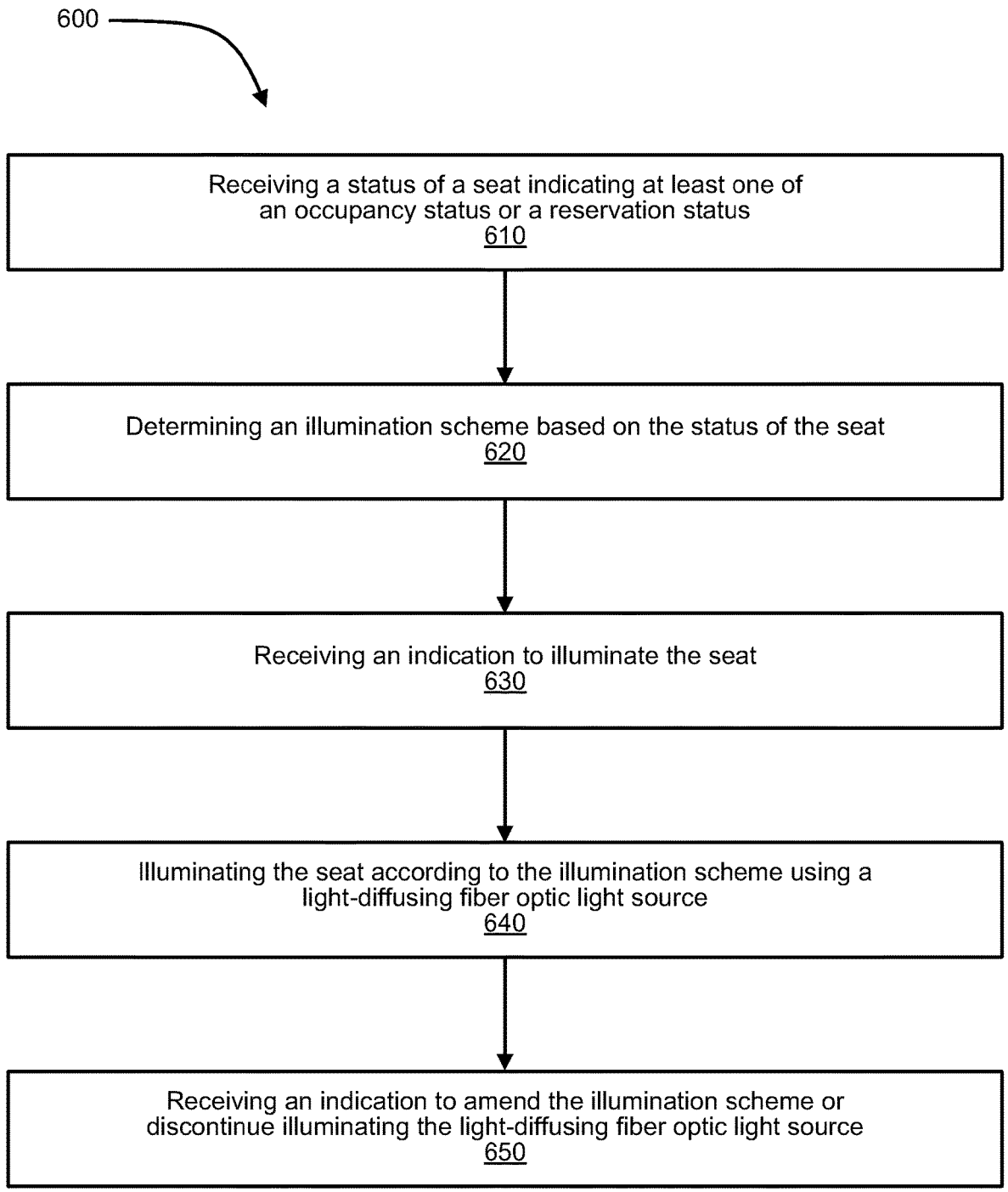
FIG. 6 is a schematic flow chart diagram illustrating a method for illuminating a light source in a rideshare application, according to one implementation.

FIG. 6 is a schematic flow chart diagram illustrating a method 600 for indicating a status of a seat. The method 600 begins and a controller receives a status of a seat indicating at least one of an occupancy status or a reservation status 610. An illumination scheme generator determines an illumination scheme based on the status of the seat 620. A controller receives an indication to illuminate a seat 630. A controller illuminates the seat according to the illumination scheme using a light-diffusing fiber optic light source 640. A controller receives an indication to amend the illumination scheme or discontinue illuminating the light-diffusing fiber optic light source 650.

Figure 7:
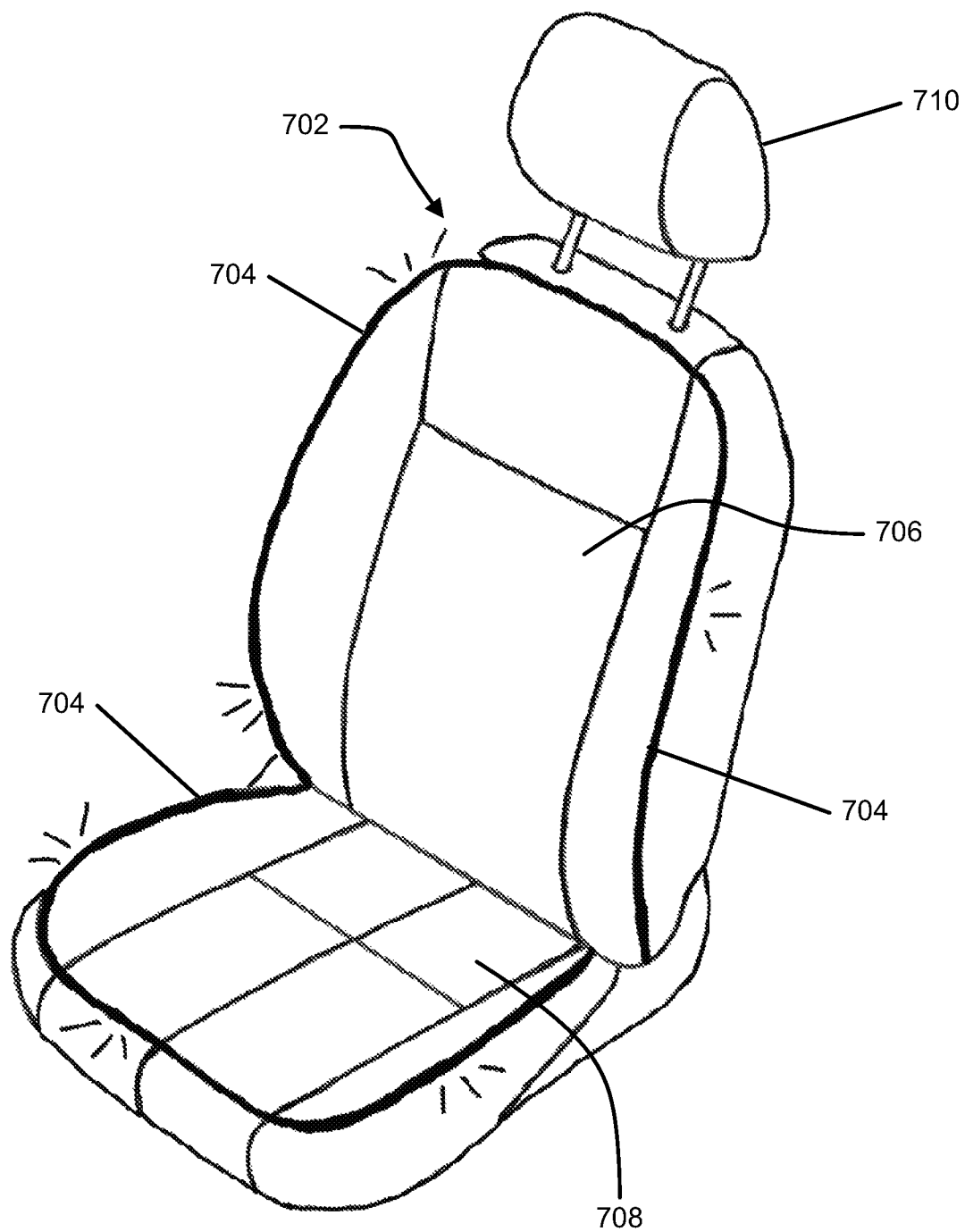
FIG. 7 is an illuminated seat, according to one implementation.

FIG. 7 is a perspective view of a seat 702 with a light-diffusing fiber optic light source 704 attached thereon. The seat 702 may include a backrest portion 706, a seat portion 708, and a headrest 710, each of which may have a light-diffusing fiber optic light source 704 attached thereon. In FIG. 7, the light-diffusing fiber optic light source 704 is attached to the exterior of the seat 702 along the perimeter of the backrest portion 706 and the seat portion 708. The light-diffusing fiber optic light source 704 may comprise a flexible fiber that may be shaped to match the curvature of any portion of the seat 702. In an implementation, the light source 704 is attached to the seat 702 at a plurality of upholstery seams. In an implementation, the light source 704 is attached to the seat 702 only on the headrest portion 710. The light-diffusing fiber may be flexible and allow for comfort or discrete lighting of a seat. For example, the flexible nature may allow the light-diffusing fiber optic light source 704 to bend or flex to avoid irritation or discomfort to a seat occupant.

Figure 8:
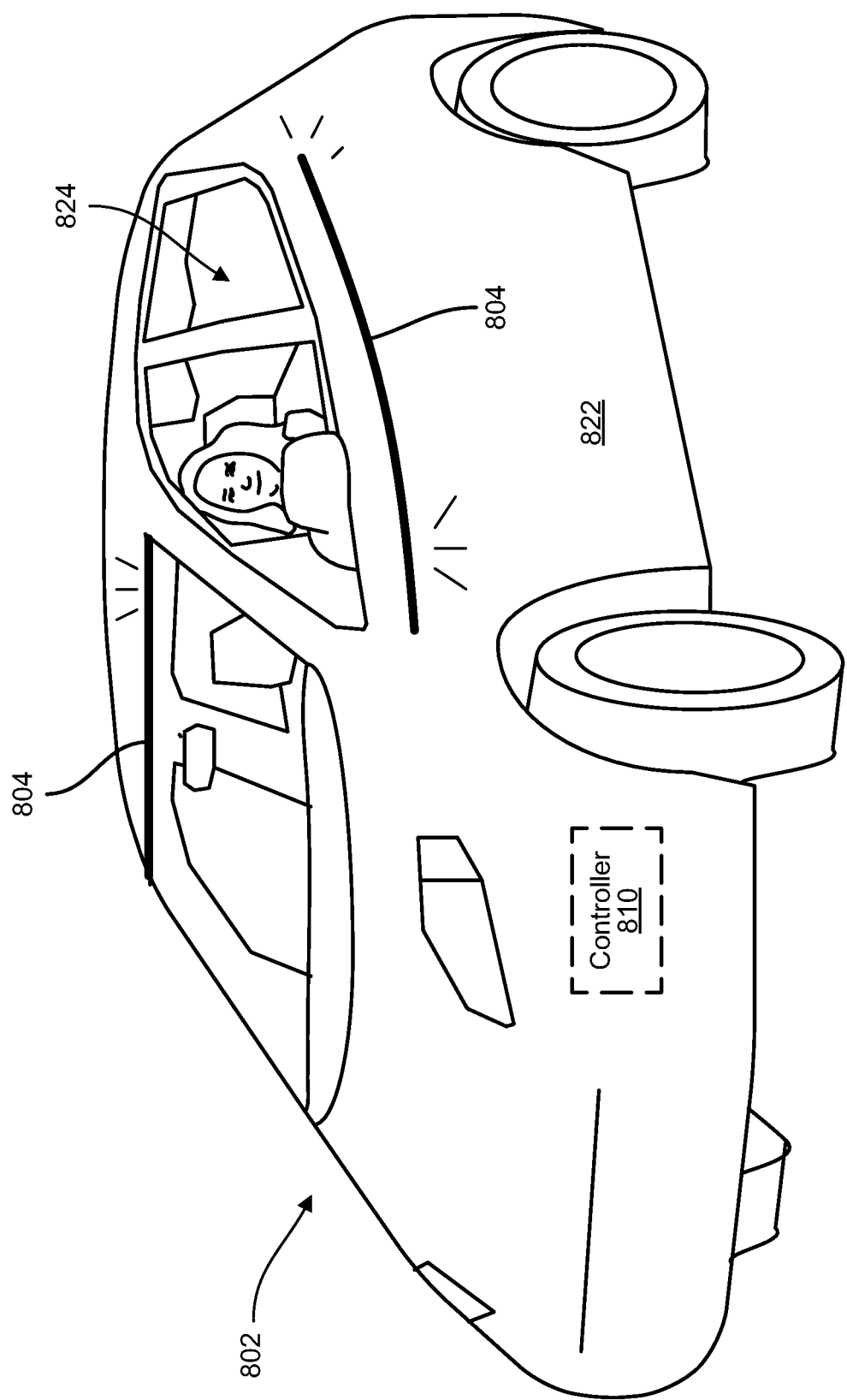
FIG. 8 is an illuminated vehicle, according to one implementation.

FIG. 8 is a perspective view of a vehicle 802 with a light-diffusing fiber optic light source 804 attached thereon. The vehicle 802 may include an exterior surface 822 where a light-diffusing fiber optic light source 804 may be attached to the vehicle 802. The vehicle 802 may further include an interior 824 that comprises a plurality of components wherein a light-diffusing fiber optic light source might be attached.

Further, the vehicle 802 may include a controller 810 located within the vehicle. The controller 810 may be in electronic communication with an onboard computer for the vehicle 802. The controller 810 may include circuitry for signaling or driving one or more light sources on or in the vehicle. The controller 810 may be in electronic communication with the light-diffusing fiber optic light source 804. In an implementation, the vehicle 802 includes the light source 804 attached to the exterior of the vehicle as shown in FIG. 8, and also includes seats within the vehicle comprising a similar light-diffusing fiber optic light source attached thereon. The controller 810 may be in electronic communication with each of the light-diffusing fiber optic light sources attached to the exterior of the vehicle 802 or attached to any component within the vehicle 802. The controller 810 may further be in electronic communication with a network interface (e.g. 132 in FIG. 1) that may connect the controller 810 to a network (e.g. 132 in FIG. 1). In an implementation, the controller may receive an indication over a network to illuminate at least one of a plurality of light-diffusing fiber light sources 804 attached to the exterior 822 of the vehicle or to any component of an interior of the vehicle.

Figure 9:
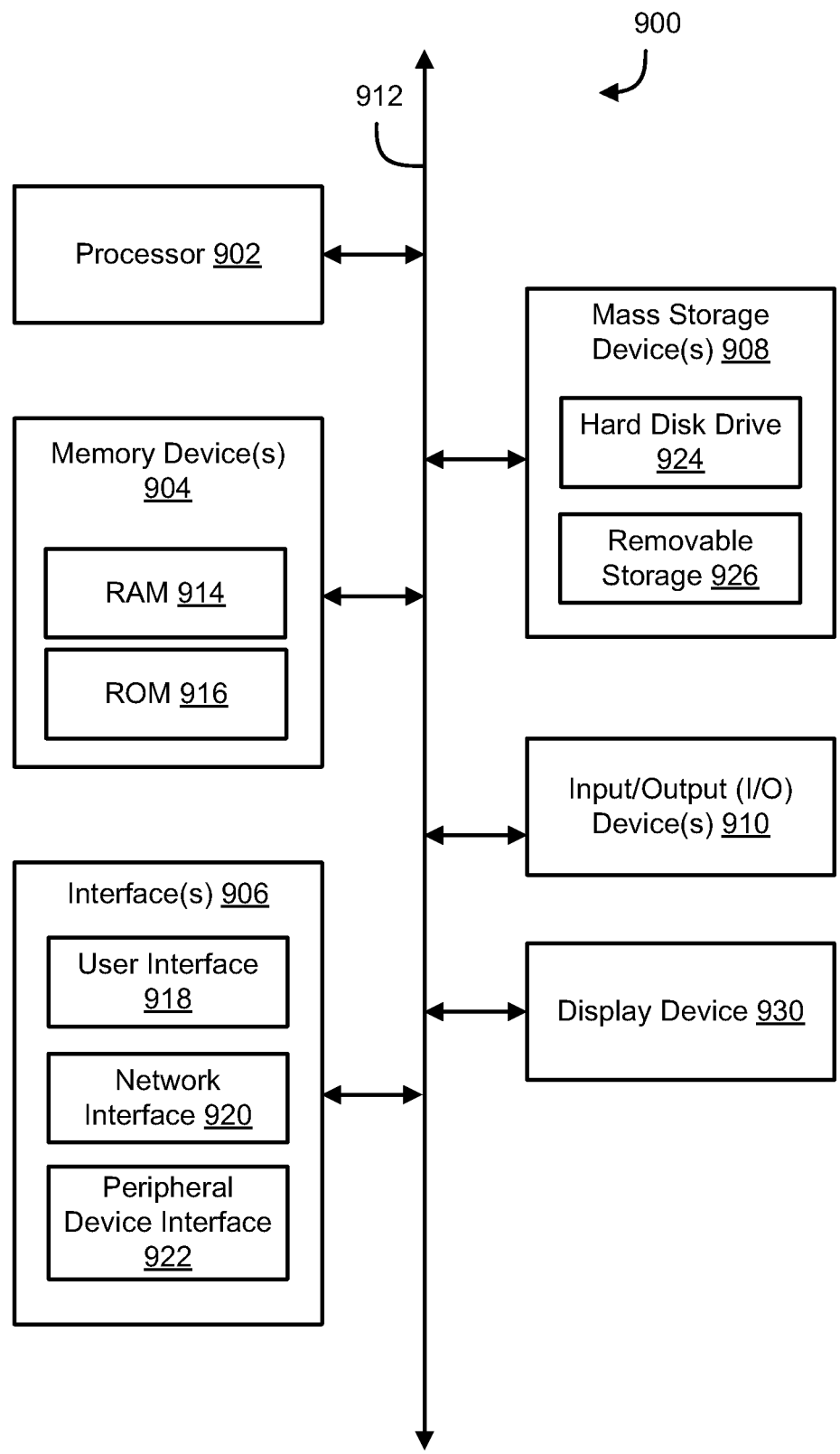
FIG. 9 is a schematic block diagram illustrating an example computing device, according to one implementation.

FIG. 9 is a schematic block diagram of an example computing device 900. Computing device 900 may be used to perform various procedures, such as those discussed herein. Computing device 900 can function as an illumination system 100, illumination scheme generator 112, or the like. Computing device 900 can perform various functions as discussed herein, such as receiving a request, determining an illumination scheme, processing a reservation, and processing functionality described herein. Computing device 900 can be any of a wide variety of computing devices, such as a desktop computer, in-dash vehicle computer, vehicle control system, a notebook computer, a server computer, a handheld computer, tablet computer, and the like.

Computing device 900 includes one or more processor(s) 902, one or more memory device(s) 904, one or more interface(s) 906, one or more mass storage device(s) 908, one or more Input/Output (I/O) device(s) 910, and a display device 930 all of which are coupled to a bus 912. Processor(s) 902 include one or more processors or controllers that execute instructions stored in memory device(s) 904 and/or mass storage device(s) 908. Processor(s) 902 may also include various types of computer-readable media, such as cache memory.

Memory device(s) 904 include various computer-readable media, such as volatile memory (e.g., random access memory (RAM) 914) and/or nonvolatile memory (e.g., read-only memory (ROM) 916). Memory device(s) 904 may also include rewritable ROM, such as Flash memory.

Mass storage device(s) 908 include various computer readable media, such as magnetic tapes, magnetic disks, optical disks, solid-state memory (e.g., Flash memory), and so forth. As shown in FIG. 9, a particular mass storage device is a hard disk drive 924. Various drives may also be included in mass storage device(s) 908 to enable reading from and/or writing to the various computer readable media. Mass storage device(s) 908 include removable media 926 and/or non-removable media.

I/O device(s) 910 include various devices that allow data and/or other information to be input to or retrieved from computing device 900. Example I/O device(s) 910 include cursor control devices, keyboards, keypads, microphones, monitors, or other display devices, speakers, printers, network interface cards, modems, and the like.

Display device 930 includes any type of device capable of displaying information to one or more users of computing device 900. Examples of display device 930 include a monitor, display terminal, video projection device, and the like.

Interface(s) 906 include various interfaces that allow computing device 900 to interact with other systems, devices, or computing environments. Example interface(s) 906 may include any number of different network interfaces 920, such as interfaces to local area networks (LANs), wide area networks (WANs), wireless networks, and the Internet. Other interface(s) include user interface 918 and peripheral device interface 922. The interface(s) 906 may also include one or more user interface elements 918. The interface(s) 906 may also include one or more peripheral interfaces such as interfaces for printers, pointing devices (mice, track pad, or any suitable user interface now known to those of ordinary skill in the field, or later discovered), keyboards, and the like.

Bus 912 allows processor(s) 902, memory device(s) 904, interface(s) 906, mass storage device(s) 908, and I/O device(s) 910 to communicate with one another, as well as other devices or computers couples to bus 912. Bus 912 represents one or more of several types of bus structures, such as system bus, PCI bus, IEEE bus, USB bus, and so forth.

For purposes of illustration, programs and other executable program components are shown herein as discrete blocks, although it is understood that such programs and components may reside at various times in different storage components of computing device 900, and are implemented in hardware, or a combination of hardware, software, and/or firmware. For example, one or more application specific integrated circuits (ASICs) can be programmed to carry out one or more of the systems and procedures described herein.

EXAMPLES

The following examples pertain to further embodiments.

Example 1 is a method for indicating a status of a seat in a vehicle. The method includes receiving a status of a seat indicating at least one of an occupancy status or a reservation status of the seat. The method includes determining an illumination scheme based on the status of the seat, and the method includes illuminating the seat according to the illumination scheme using a light-diffusing fiber optic light source attached to the seat.

In Example 2, the illumination scheme as in Example 1 includes an indication of at least one of a wavelength of light, a light intensity, and a duration of illumination.

In Example 3, the method as in any of Examples 1-2 further includes receiving an indication that a passenger is in close proximity to the vehicle and illuminating the seat according to the illumination scheme when the passenger is in close proximity to the vehicle.

In Example 4, determining the illumination scheme based on the status of the seat as in any of Examples 1-3 includes receiving an illumination scheme request from a user.

In Example 5, the illumination scheme request as in Example 4 includes an indication of at least one of a wavelength of light, a light intensity, and a duration of illumination.

In Example 6, the method as in any of Examples 1-5 further includes receiving an indication to amend the illumination scheme or discontinue illuminating the light-diffusing fiber optic light source.

Example 7 is a system for indicating a status of a seat in a vehicle. The system includes a plurality of seats. The system includes a light-diffusing fiber optic light source attached to at least one of the plurality of seats. The system includes a receiver configured to receive a status of at least one of the plurality of seats. The system includes a controller, wherein the controller is configured to: determine an illumination scheme based on the status, and illuminate the light-diffusing fiber optic light source attached to the at least one of the plurality of seats according to the illumination scheme.

In Example 8, the status as in Example 7 indicates at least one of an occupancy status, a reservation status, a health status of an occupier of a seat, and/or a characteristic of the at least one of the plurality of seats.

In Example 9, the illumination scheme as in any of Examples 7-8 includes an indication of at least one of a wavelength of light, an intensity of light, and/or a duration of illumination.

In Example 10, the receiver as in any of Examples 7-9 is configured to receive the status over a network from a mobile device operated by a user.

In Example 11, the controller as in any of Examples 7-10 further includes a controller user interface and the controller is configured to receive a user input.

In Example 12, the system as in any of Examples 7-11 further includes a GPS unit configured to determine a location of the vehicle.

In Example 13, the controller in the system as in Example 12 is configured to illuminate the light-diffusing fiber optic light source according to the illumination scheme when the vehicle is located at a particular location.

In Example 14, the controller as in any of Examples 7-13 determines the illumination scheme based on an illumination scheme request received from a user.

In Example 15, the controller as in any of Examples 7-14 is configured to receive an indication that a passenger is in close proximity to the vehicle. The controller is further configured to illuminate the light-diffusing fiber optic light source attached to the at least one of the plurality of seats when the user is in close proximity to the vehicle.

Example 16 is a system for indicating a use status of a vehicle. The system includes a light-diffusing fiber optic light source. The system includes a receiver configured to receive a use status of the vehicle. The system includes a controller configured to: determine an illumination scheme based on the use status, and illuminate the light-diffusing fiber optic light source according to the illumination scheme.

In Example 17, the light-diffusing fiber optic light source as in Example 16 is attached to one or more of: a seat of the vehicle, or an exterior of the vehicle.

In Example 18, the controller as in any of Examples 16-17 is configured to determine the illumination scheme based on an illumination scheme request received from a user.

In Example 19, the controller as in any of Examples 16-18 is configured to receive an indication that a passenger is in close proximity to the vehicle. The controller is further configured to illuminate the light-diffusing fiber optic light source when the passenger is in close proximity to the vehicle.

In Example 20, the use status of the vehicle as in any of Examples 16-19 indicates at least one of a reservation status, an occupancy status, or an indication of the vehicle's driving route.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium, which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer.

Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. The terms "modules" and "components" are used in the names of certain components to reflect their implementation independence in software, hardware, circuitry, sensors, and/or the like. As one skilled in the art will appreciate, components may be referred to by different names. This document does not intend to distinguish between components that differ in name, but not function.

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

The invention claimed is:

1. A method for indicating a status of a seat in a vehicle, the method comprising:
   receiving the status of the seat indicating at least one of an occupancy status or a reservation status of the seat;
   determining an illumination scheme based on the status of the seat; and
   illuminating the seat according to the illumination scheme using a light-diffusing fiber optic light source attached to the seat,
   wherein determining the illumination scheme based on the status of the seat comprises receiving an illumination scheme request from a user.

2. The method of claim 1, wherein the illumination scheme comprises an indication of at least one of a wavelength of light, a light intensity, and a duration of illumination.

3. The method of claim 1, further comprising receiving an indication that a passenger is in close proximity to the vehicle and illuminating the seat according to the illumination scheme when the passenger is in close proximity to the vehicle.

4. The method of claim 1, wherein the illumination scheme request comprises an indication of at least one of a wavelength of light, a light intensity, and a duration of illumination.

5. The method of claim 1, further comprising receiving an indication to amend the illumination scheme or discontinue illuminating the light-diffusing fiber optic light source.

6. A system for indicating a status of a seat in a vehicle, the system comprising:
   a plurality of seats;
   a light-diffusing fiber optic light source attached to at least one of the plurality of seats;
   a receiver configured to receive the status of at least one of the plurality of seats; and
   a controller, wherein the controller is configured to:
     determine an illumination scheme based on the status; and
     illuminate the light-diffusing fiber optic light source attached to the at least one of the plurality of seats according to the illumination scheme,
     wherein the controller determines the illumination scheme based on an illumination scheme request received from a user.

7. The system of claim 6, wherein the status indicates at least one of an occupancy status, a reservation status, a health status of an occupier of the seat, and a characteristic of the at least one of the plurality of seats.

8. The system of claim 6, wherein the illumination scheme comprises an indication of at least one of a wavelength of light, an intensity of light, and a duration of illumination.

9. The system of claim 6, wherein the receiver is configured to receive the status over a network from a mobile device operated by a user.

10. The system of claim 6, wherein the controller further includes a controller user interface and the controller is configured to receive a user input.

11. The system of claim 6, further comprising a GPS unit configured to determine a location of the vehicle.

12. The system of claim 11, wherein the controller is configured to illuminate the light-diffusing fiber optic light source according to the illumination scheme when the vehicle is located at a particular location.

13. The system of claim 6, wherein the controller is configured to receive an indication that a passenger is within a close proximity to the vehicle and the controller is configured to illuminate the light-diffusing fiber optic light source attached to the at least one of the plurality of seats when the user is in close proximity to the vehicle.

14. A system for indicating a use status of a vehicle, comprising:
    a light-diffusing fiber optic light source;
    a receiver configured to receive the use status of the vehicle; and
    a controller configured to:
        determine an illumination scheme based on the use status; and
        illuminate the light-diffusing fiber optic light source according to the illumination scheme,
        wherein the controller is configured to determine the illumination scheme based on an illumination scheme request received from a user.

15. The system of claim 14, wherein the light-diffusing fiber optic light source is attached to one or more of:
    a seat of the vehicle; or
    an exterior of the vehicle.

16. The system of claim 14, wherein the controller is configured to receive an indication that a passenger is in close proximity to the vehicle and illuminate the light-diffusing fiber optic light source when the passenger is in close proximity to the vehicle.

17. The system of claim 14, wherein the use status of the vehicle indicates at least one of a reservation status, an occupancy status, or an indication of a driving route of the vehicle.

* * * * *